US007797705B2

(12) United States Patent
Oka

(10) Patent No.: US 7,797,705 B2
(45) Date of Patent: Sep. 14, 2010

(54) SYSTEM FOR ASSIGNING TASKS ACCORDING TO THE MAGNITUDE OF THE LOAD OF INFORMATION PROCESSING REQUESTED

(75) Inventor: Masaaki Oka, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1944 days.

(21) Appl. No.: 10/804,790

(22) Filed: Mar. 19, 2004

(65) Prior Publication Data

US 2004/0205759 A1 Oct. 14, 2004

(30) Foreign Application Priority Data

Mar. 20, 2003 (JP) .............................. 2003-078492

(51) Int. Cl.
*G06F 9/46* (2006.01)
*G06F 15/173* (2006.01)

(52) U.S. Cl. ........................................ 718/104; 709/226
(58) Field of Classification Search ................. 718/104; 709/201, 226
See application file for complete search history.

(56) References Cited

U.S. PATENT DOCUMENTS

| 6,009,455 | A  | * | 12/1999 | Doyle ......................... 709/201 |
| 6,356,947 | B1 | * | 3/2002  | Lutterschmidt ............. 709/231 |
| 6,484,204 | B1 | * | 11/2002 | Rabinovich ................ 709/226 |
| 6,938,256 | B2 | * | 8/2005  | Deng et al. ................. 718/104 |
| 7,467,383 | B2 | * | 12/2008 | Inchingolo et al. ......... 718/104 |
| 2002/0069279 | A1 | * | 6/2002 | Romero et al. ............. 709/225 |

FOREIGN PATENT DOCUMENTS

WO  WO 01/13228 A2  2/2001

OTHER PUBLICATIONS

Platform Computing Corporation; "LSF Batch User's Guide, Sixth Edition"; Aug. 1998; pp. I-XVI, 1-157, 159-163 and 165-226; sixth edition; XP002336279; Retrieved from the internet.
Condor Team; "Condor Version 6.2.2 Manual"; University of Wisconsin-Madison; Dec. 5, 2001; pp. I-XVI and pp. 1-370; XP002336280.
Chandra N. Sekharan et al.; "Load balancing methods for ray tracing and binary tree computing using PVM"; Parallel Computing; vol. 21; No. 12; Dec. 1995; pp. 1963-1978; XP004000341; ISSN: 0167-8191; Elsevier Publishers; Amsterdam, NL.

(Continued)

*Primary Examiner*—Meng-Ai An
*Assistant Examiner*—Camquy Truong
(74) *Attorney, Agent, or Firm*—Fitch, Even, Tabin & Flannery

(57) ABSTRACT

The objective is to facilitate leasing of excess computing resources of a processor when computing resources of other processors are deficient, thereby making distributed computing more efficient.

A computing resource of a processor is clustered into sub processors, and the operating status of each of the sub processors is monitored by a management processor, so that a task is assigned to a sub processor that is operated according to the magnitude of the load of information processing requested. When a request for resource leasing is made from another computer via I/O interface, a computing resource of a idle sub processor is leased.

18 Claims, 9 Drawing Sheets

OTHER PUBLICATIONS

Michael R. Steed et al.; "Performance Prediction of PVM Programs"; Parallel Processing Symposium; 1996; Proceedings of IPPS '96; The 10th International Honolulu, HI; USA 15-19; Apr. 1996, Los Alamitos, CA; USA; IEEE Comput. Soc; US; Apr. 15, 1996, pp. 803-807; XP010165059; ISBN: 0-8186-7255-2.

Patent Cooperation Treaty; "Written Opinion of the International Searching Authority"; issued over corresponding PCT Application No. PCT/JP2004/003775; mailed Aug. 1, 2005; 9 pages.

Patent Cooperation Treaty; "International Search Report"; issued over corresponding PCT Application No. PCT/JP2004/003775, mailed Aug. 1, 2005, 5 pages.

* cited by examiner (a)

(b)

(c)

(d)

SYSTEM FOR ASSIGNING TASKS ACCORDING TO THE MAGNITUDE OF THE LOAD OF INFORMATION PROCESSING REQUESTED

CROSS REFERENCE TO RELATED APPLICATION

The present application claims priority from Japanese Application No. 2003-78492 filed Mar. 20, 2003, the disclosure of which is hereby incorporated by reference herein.

BACKGROUND OF THE INVENTION

The present invention relates to a load balancing mechanism through collaboration of a plurality of information processing devices, or computers, such as, for example, personal computers and servers.

There are two approaches to load balancing one task through a plurality of computers connected to a network.

One approach is to first determine which computer to load balance and assign the content of information processing (hereinafter referred to as "task") thereto; another approach is such that when the load is found too heavy after a task is executed by a certain computer, a search is conducted for another computer to assign the task thereto.

In the former case, the magnitude of the load of the task must be predicted beforehand; however, for information processing where the magnitude of the load is unpredictable, assignment of tasks cannot be achieved. In the latter case, there is no need for predicting the magnitude of the load; however, once the load is found too heavy, special processing is required to search for another computer having excess computing resources. However, after a computer having excess computing resources is found, if the usage status of that computer changes when a task is actually assigned thereto, it is necessary to search for still another computer having excess computing resources to load balance, thus resulting in complicated procedures accordingly.

Generally, when tasks are executed by a single computing resource within a computer, time sharing process or the like is employed to assign tasks. The degree with which the computing resources are left is determined by how much time is used to complete the task as the task is partitioned by a certain time unit. FIG. 12(a) illustrates this situation.

However, because the time unit to partition the task differs depending on the type of task, it is difficult to predict whether another task can be assigned to the spare time. Furthermore, if the unit time is aligned forcefully, the overhead due to task switching becomes greater, thus resulting in more difficulty in prediction.

FIG. 12(b) illustrates a timing example where a plurality of tasks are executed by a single processor via time sharing. In the example of FIG. 12(b), after task A completes one unit of processing, another task is assigned for a certain time (during which task A has a spare time); after a certain time, task A is repeated again. In this case, if one unit of processing of task A is always assured to be completed in a certain time, a percentage of task A occupying the overall processing time is conveniently fixed; however, if it is not completed within a certain time due to task execution conditions, the percentage of processing time for task A varies, as shown in FIG. 12(c). Cases where the processing time varies due to task execution conditions include examples where the number of objects to be drawn varies when the viewpoint moves during graphic processing, and where whether to use preceding and/or succeeding frames of data varies depending upon the image content during decompression of a compressed video image. "One unit of processing" in such cases includes one frame worth of processing, for example.

To solve the inconvenience associated with varying percentage of processing time due to task execution conditions as described above, one conceivable scenario is to partition one unit of processing into smallest time intervals as possible and abort task A after a certain time has elapsed. In this case, the situation may occur, as shown in FIG. 12(d), where the task must be switched at switching timing A, instead of switching timing B where the task can be switched conveniently. In that case, unless much more data (context) is saved, the task cannot be resumed. This data saving/loading could adversely result in processing overhead.

Accordingly, with the methods for assigning a plurality of tasks by a single processor via timing sharing, it is difficult to achieve both stability of assigned time and efficiency in processing.

The present invention has its main objective to provide a distributed information processing mechanism that solves the afore-described prior art problem.

SUMMARY OF THE INVENTION

The present invention provides a mechanism such that with clustering of program execution means for executing tasks, leasing of computing resources is facilitated when computing resources of other clusters interconnected become deficient. More specifically, an information processing system, information processing device, distributed information processing method, and computer program that enables distributed processing (load balancing) are provided.

The information processing system of the present invention is an information processing system, clustered by a plurality of information processing devices, wherein: at least one of the information processing devices comprising: metric information management means for storing metric information in an easily updateable manner, said metric information representing processing metric of a part or whole of other information processing devices as seen from its own device; load measurement means for measuring the magnitude of the load of information processing requested; determination means for comparing the magnitude of the load measured by the load measurement means and the metric information stored by said metric information management means, thereby determining a available (candidate) device, said available device being such that a part or whole of said information processing requested can be distributed and executed; and task assignment means for assigning a task to the available device determined by said available determination means.

The "available device" means an information processing device which is available for executing the requested and distributed information processing.

With such an information processing system, the processing metric of available device can be ascertained on the information processing device side; as such, if the computing resource becomes deficient at that information processing device, it can lease computing resources of other available devices to execute the task, thereby allowing for efficient distributed information processing.

When the information processing system is regarded as one program execution means for executing information processing, individual information processing devices correspond to its partitioned clusters. Generally, the information processing device is a unit or device incorporating a processor as its main component; however, if it is a program executable type, the processor may also serves as an information processing device. In that case, the device comprised of multiple processors corresponds to the information processing system.

With the afore-described information processing system, said metric information management means includes: first list management means for acquiring first metric information representative of static processing metric of said other information processing devices to determine at least one available device, and storing a first list in a predetermined memory area, said first list being such that the available devices determined are listed; and second management means for measuring second metric information representative of dynamic processing metric of the available devices listed in said first list, creating a second list such that the second metric information measured is classified and listed per processing metric, sorting the available devices having the second metric information listed in the second list according to the task execution condition to determine at least one available device suitable for each task execution condition, and storing an index list, in which the determined at least one available device is listed, in a predetermined memory area; wherein the second metric information of the available devices listed in the index list is read from said memory area and supplied as said metric information to said available determination means.

Because the second metric information varies considerably from time to time, said second available list and said index list created should preferably be updated more frequently than said first available list.

More specifically, the first available list is such that available devices are listed based on information representative of intrinsically time-independent (i.e., "static") processing metrics, such as the type and number of available devices. The first available list needs to be updated periodically because each of the available devices may start and end at any point in time. On the other hand, the second available list and index list are such that available devices are listed based on information representative of processing metrics that are significantly affected by the situation from time to time (i.e., "dynamic"), such as the operating status of the available devices, and thus need to be updated more frequently than the first available list. Their updates should preferably be done prior to task execution.

Said first available list management means uses, as said first metric information, configuration information of the program execution means provided by individual information processing devices and information representative of the type of program that can be executed by said program execution means, for example, and compares said first metric information regarding a plurality of information processing devices, thereby determining the listing order in said first available list.

Said second list management means sends a processing request to the available device listed in said first list, and receives a response result corresponding to the processing request, thereby acquiring said second metric information of that available device. More specifically, said second list management means weights said second metric information with a coefficient value that is preset according to the type of processing metric, thereby creating said second available list per processing metric.

An information processing system without an index list may also be embodied. That is, said metric information management means includes: first list management means for acquiring first metric information representative of static processing metric of said other information processing devices, determining at least one available device, and storing a first list in a predetermined memory area, said first list being such that the available devices determined are listed; and second list management means for measuring second metric information representative of dynamic processing metric of the available devices listed in said first list, and weighting the second metric information measured with a coefficient value that is preset according to each of a plurality of task execution conditions, thereby storing a second list in a predetermined memory area, said second list being such that available devices having second metric information that differs depending upon task execution conditions are listed; wherein the second metric information of the available devices listed in the second list is read from said memory area and supplied as said metric information to said available determination means.

When said plurality of information processing devices are interconnected via a network, said second list management means operates to send said processing request via said network, and receive a response result corresponding to the processing request via said network.

At least one of said plurality of information processing devices may be configured such that: said program execution means is partitioned into a plurality of clusters; and the operating status of each cluster can be notified to other information processing devices.

If the processing capacity of the partitioned cluster is equivalent to the other clusters, the operating status of the information processing device can be quantified as the number of the operating clusters or the number of non-operating clusters. Thus, the program execution means may be configured so that said information processing device partitioned into clusters notifies to said other information processing devices the number of available clusters to be used by the other information processing device as said operating status, thereby facilitating task assignment on the notified end. For example, such operation can be achieved that because three clusters are deficient under a certain task execution condition, three clusters are searched and then assigned.

The information processing device of the present invention is an information processing device for executing information processing such that the magnitude of its load is unpredictable, said information processing device comprising: program execution means partitioned into a plurality of clusters; metric information management means for storing metric information in an easily updateable manner, said metric information representing processing metric of each of the clusters of said program execution means; load measurement means for measuring the magnitude of the load of the information processing requested; determination means for determining at least one available device by comparing the magnitude of the load measured by said load measurement means and the metric information stored in said metric information management means, said at least one available cluster being such that said information processing requested can be distributed and executed; task assignment means for assigning a part of said information processing requested to each of said plurality of available clusters determined by said available determination means; and output means for combining and outputting execution results from the respective available clusters assigned by said task assignment means.

With such an information processing device, the number of available clusters corresponding to the magnitude of the load may be selected to execute the task, so that information processing can be executed without wasting the computing resources.

To make information processing load-balanceable in cooperation with other information processing devices, the information processing device further comprises: processing request execution means for executing required information processing corresponding to a processing request issued by another information processing device, and returning the execution result thereof, together with a transmission start time, to said another information processing device; and notification means for notifying the metric information stored in said metric information management means to other information processing devices.

Each of said plurality of clusters may further comprise a processor.

The distributed information processing method of the present invention is such that: each of a plurality of information processing devices interconnected via a network measures processing metric of other information processing devices through the network, and mutually stores metric information representative of the measured processing metric in a predetermined memory area in an updateable manner, and a part of resources of a program execution means of the information processing devices itself being available for use in another information processing device in response to a processing request, and at each of the information processing devices, when a request occurs for information processing such that the magnitude of load is unpredictable, the information processing device where a request for such information processing has occurred executes the processes of: measuring the magnitude of the load of said information processing; comparing the magnitude of the load measured and the metric information stored in said memory area to determine one or plurality of available device(s) where said requested information processing can be distributed and executed; assigning a part of said requested information processing to the available device(s) determined; and combining and outputting the execution result of the assigned available device(s).

With this distributed information processing method, because only a part of the available resources of the program execution means is used by another information processing device, information processing can be achieved efficiently, as compared to when distributed information processing is executed among a plurality of information processing devices with their processing metric mutually pre-known.

The computer program of the present invention is a computer program, which causes an information processing device connected to a plurality of other information processing devices via a network to execute the processes of: measuring processing metric of other information processing devices through said network; storing metric information representative of the measured processing metric of the other information processing devices in a predetermined memory area in an easily updateable manner; when a certain request for information processing such that the magnitude of load is unpredictable occurs, measuring the magnitude of the load of such information processing; comparing the magnitude of the load measured and the metric information stored in said memory area to determine one or plurality of available device (s) such that said requested information processing can be distributed and executed; assigning a part of said requested information processing to the available devices determined; and combining and outputting execution results of the assigned available devices.

BRIEF DESCRIPTION OF THE DRAWINGS

FIG. 5(a) is a diagram illustrating a content example of a first available list.

FIG. 5(b) is a diagram illustrating a content example of a second available list.

FIG. 5(c) is a diagram illustrating a content example of an index list.

DETAILED DESCRIPTION OF THE PREFERRED EMBODIMENTS

An embodiment of the present invention is described below.

Figure 1:
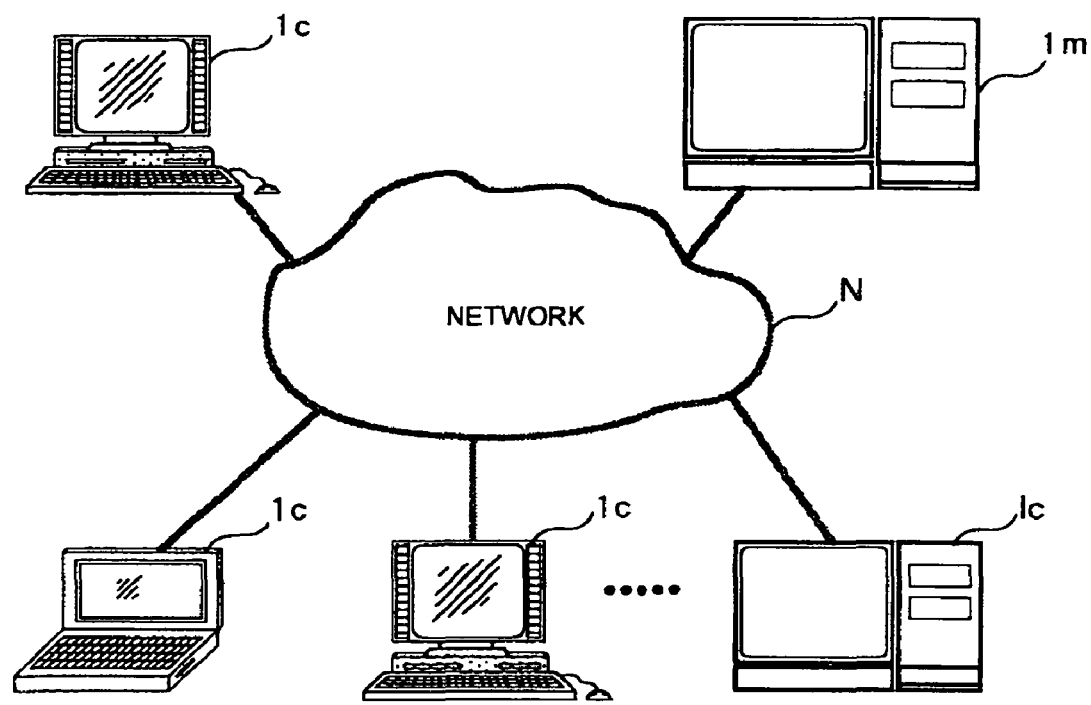
FIG. 1 is an overall schematic diagram of an information processing system where the present invention is employed.

The present invention can be implemented as an information processing system configured as shown in FIG. 1. The information processing system is configured so that a plurality of computers $1m$ and $1c$ are interconnected via a wide-area network, such as the Internet. In the present embodiment, the computer that primarily performs distributed information processing is designated as main computer $1m$, while the computer that leases a part of its own program execution means to the main computer $1m$ is designated as available (candidate) computer $1c$, for the sake of convenience; however, if there is no need to distinguish between the two, they are designated simply as "computer".

The hardware architecture of the program execution means in each of the computers $1m$ and $1c$, that is, the type and number of processors, capacity (processing speed) of individual processors, the amount of memory, and so forth are arbitrary; however, in the present embodiment, an explanation is given below assuming that they have all equally configured program execution means, for the sake of convenience.

Figure 2:
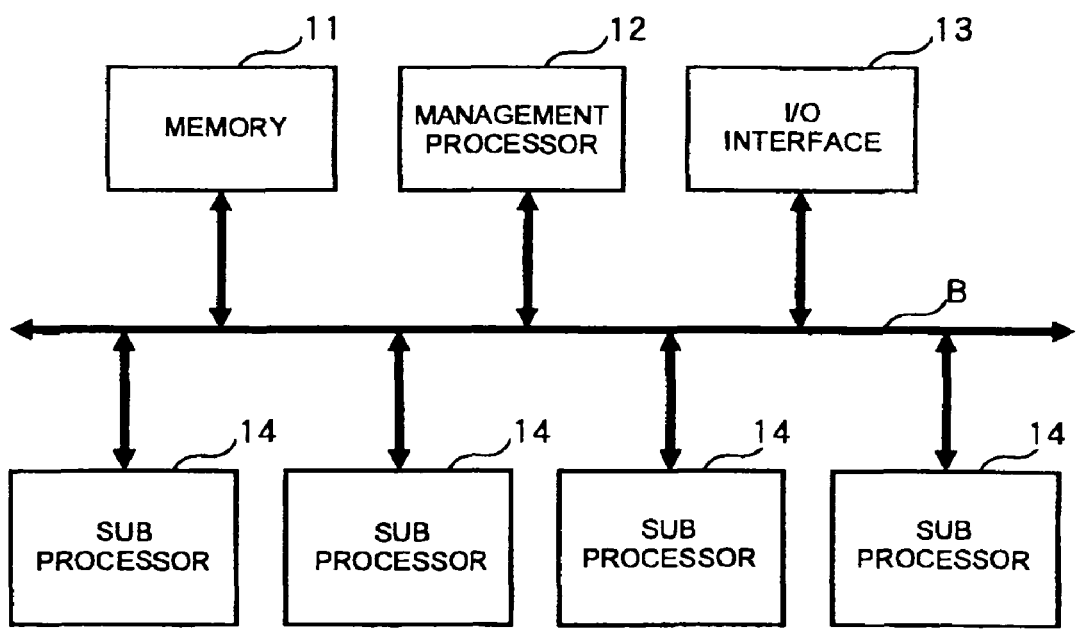
FIG. 2 is a diagram illustrating a hardware architecture example of a program execution means of the computer which is a component of the information processing system.

The program execution means in the computers $1m$ and $1c$ is comprised of a memory 11, a management processor 12, an I/O interface 13, and four sub processors 14, interconnected via a bus B, as shown in FIG. 2. The memory 11 stores various digital information, including programs and data, as well as time data, and various lists, which are described in detail hereinbelow. The digital information, such as programs and data, is stored into the memory 11, either through the network N or by installing the digital information stored in a portable storage medium.

The I/O interface 13 is a well-known mechanism that permits transfer of information to and from other computers connected to the network N or other external computers. The sub processor 14 executes a task assigned by the management processor 12. In the present embodiment, a plurality of computers 1m and 1c exist as clusters of the program execution means of the information processing system, and the program execution means of each computer 1m and 1c itself is also partitioned into four clusters.

Figure 3:
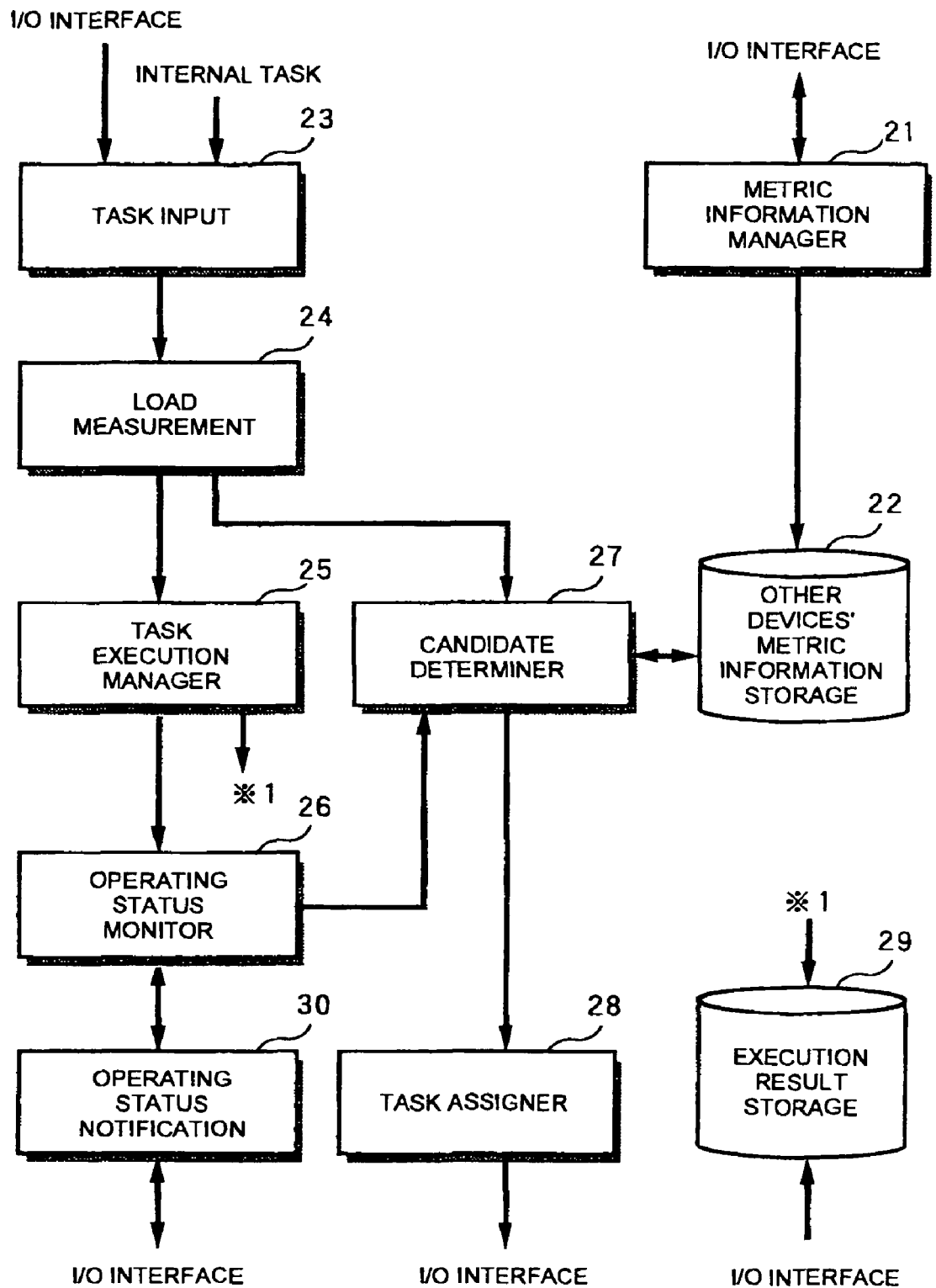
FIG. 3 is a functional block diagram formed in the computer.

The management processor 12 causes the program stored in the memory to form functions as depicted in FIG. 3 within its own computer.

That is, functions of a metric information management portion 21, an other devices' metric information storage portion 22, a task input portion 23, a load measurement portion 24, a task execution management portion 25, an operating status monitoring portion 26, an candidate (available) determination portion 27, a task assignment portion 28, an execution result storage portion 29, and an operating status notification portion 30 are formed.

Figures 4, 5:
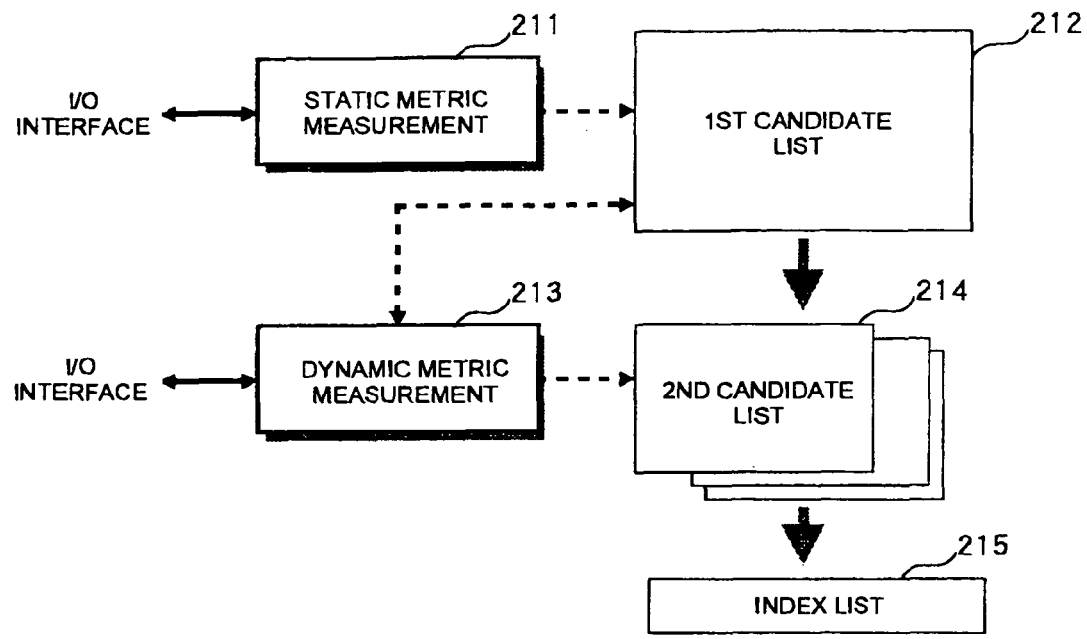
FIG. 4 is a detailed block diagram of a metric information management portion.

The metric information management portion 21 periodically measures or acquires metric information representative of processing metric of other candidate (available) computer 1c as seen from its own, and lists its metric information as needed. The metric information includes first metric information representative of static processing metric, and second metric information representative of dynamic processing metric. To list such metric information, the metric information management portion 21 measures or acquires the first metric information at a static metric measurement portion 211 to create a first candidate (available) list 212, as shown in FIG. 4. It also selects from the first available (candidate) list 212 available computers 1c where task assignment is originally possible, and measures the second metric information regarding the selected available computers 1c at a dynamic metric measurement portion 213 to determine an actually task-assignable available computer 1c; a second candidate (available) list 214 where the second metric information is listed per processing metric, as well as the second metric information, is sorted (rearranged) according to the task execution condition to create an index list 215 where available computers 1c having most suitable second metric information are listed according to the task execution condition.

The created first available list 212, second available list 214, and index list 215 are stored in a memory area of the other devices' metric information storage portion 22, and updated as appropriate. It should be appreciated that the update timing and the number of items to be updated differ significantly between the first available list 212 and the second available list 214 and index list 215, as described hereinbelow.

The first metric information in the present embodiment is information specific to the available computer 1c that represents the type of processor, the number of processors, the capacity (processing speed) of individual processors, the type of executable program, the amount of memory, and other load-balanceable processing capacity (including information of whether load balancing is possible or not). The first metric information can be acquired, for example, by transferring an inquiry program from the static metric measurement portion 211 to each available computer 1c, and returning the hardware configuration information gathered by the operating system installed in that available computer 1c, based on that program, together with the transfer start time. The information may also be acquired by allowing the available computer 1c to autonomously send it. For its own measurement, the program and data for metric evaluation is transferred to the available computer 1c, and a response from that available computer 1c is measured.

Because the available computer 1c starts and stops as appropriate, the metric information management portion 21 periodically measures the first metric information, and updates the first available list 212 of the other devices' metric information storage portion 22.

The second metric information is information specific to the available computer 1c that varies according to the situation from time to time, such as, for example, the transfer status (including the congestion state) of the network N for the available computer 1c selected from the first available list 212, and the operating status, e.g., idle state, of the sub processor 14 in each available computer 1c.

The second metric information may be quantified (e.g., represented in numeric form), for example, by issuing a processing request from the dynamic metric measurement portion 213 to each available computer 1c and then measuring the time until the processing result is received. The program intended merely to send the data received may be transferred to measure the time until the data is received. Generally, the shorter this time, the higher the dynamic processing metric. Alternatively, the available computer 1c may be inquired about the idle state of the sub processor 14 or the like, and the data returned corresponding to that inquiry may be used as the second metric information.

It should be appreciated that when the second available list 214 is created at the metric information management portion 21, the second metric information may be weighted with a coefficient value that is set according to the preset type of processing metric, thereby allowing for classification per processing metric; thus, there is an advantage that creation of the index list 215 for actually determining the available computer 1c is facilitated.

A content example of the first available list 212 created by the static metric measurement portion 211 is shown in FIG. 5(a); a content example of the second available list 214 created by the dynamic metric measurement portion 213 is shown in FIG. 5(b); and an example of the index list 215 of the available computers 1c created by sorting them in optimum order according to the task execution condition (condition suitable for task execution) from the second available list 214 is shown in FIG. 5(c).

In FIG. 5(a), "AD" denotes an address of the available computer 1c; "PID" denotes an identification (ID) for identifying the type of processing or program that can be executed by each available computer 1c; "SID" denotes configuration information of each available computer 1c (the number of processors, capacity of individual processors, and so forth).

"3" in the PID column denotes three-dimensional processing (or program for that purpose); "G" denotes geometry processing (or program for that purpose); "R" denotes rendering processing (or program for that purpose). C1 and C4 in the SID column stand for the type of the processor; "P1 through P3" represent the distributed processing capacity. For example, the available computer 1c with "311" for AD, "3, G, R" for PID, and C1, P3 for SID means a load-balanceable computer with three-dimensional geometry processing and rendering capabilities.

The second available list 214 shown in FIG. 5(b) lists, as an example of the second metric information, the transfer status of the available computer 1c measured by the dynamic metric measurement portion 213, and the state of the unloaded computing resources. In FIG. 5(b), "AD" denotes an address of the available computer 1c; "C1" in the unloaded computing resources column denotes the type of the processor; and "P1, P2" denote the distributed computing capacity. In the example shown, the available computer with "311" for AD has a large transferable data size at the time of measurement, with a medium receivable size, but a high response; its unloaded computing resources have C1, with a distributed processing capacity of P1.

In the index list 215 shown in FIG. 5(c) are stored the addresses ("AD" of FIGS. 5(a) and (b)) of the available computers 1c sorted from the second available list 214 according to the task execution conditions, such as geometry processing and rendering processing. It is shown that upon execution of a task, by sequentially moving through the index list 215 from top, the available computer 1c can be assigned most efficiently under that task execution condition.

The index list 215 is created at the time when the second available list 214 is created. In other words, the index list 215 is created as the metric information management portion 21 evaluates and sorts the second metric information listed in the second available list 214 according to the task execution condition to be assigned to the other available computer 1c. The index list 215 may also be created at the time when a assigned task occurs or is ready to occur.

It should be appreciated that because the second metric information varies considerably from time to time as described above, the metric information management portion 21 updates the second available list 214 and index list 215 more frequently than the first available list 212. As a result, the contents of various metric information stored in the other devices' metric information storage portion 22 are up-to-the-minute regarding each available computer 1c.

The task input portion 23 accepts the content (task) of information processing requested from the available computer 1c or other external computer via the 10 interface 13. Alternatively, it accepts the content of information processing requested from the application within the main computer 1m. The load measurement portion 24 measures, for example, the amount of information to be processed per unit time, thereby measuring the magnitude of the load of the information processing requested.

Upon execution of the information processing, the task execution management portion 25 assigns a task to its own sub processor 14 and prompts for the execution thereof.

The operating status monitoring portion 26 monitors how many sub processors 14 are actually operating, and outputs, as numeric data, whether there is any load to spare; and, if so, how many sub processors 14 are idle. To obtain information on the idle state of the sub processors 14 of the main computer 1m, it also has the capability of notifying the requesting side via the operating status notification portion 30 when a request for the monitoring result is issued from other available computer 1c.

The available determination portion 27 compares the magnitude of the load measured by the load measurement portion 24, the result of monitoring by the operating status monitoring portion 26, and the metric information stored in the other devices' metric information storage portion 22, thereby determining whether it is necessary to load balance a part or whole of the task of the information processing requested, and, if so, which available computer 1c to be load balanceable.

The task assignment portion 28 assigns a part or whole of the task of the information processing to the available computer 1c determined by the available determination portion 27, and the execution result storage portion 29 temporarily stores the result data of the information processing executed by its own sub processor 14 and the available computer 1 assigned.

[Distributed Information Processing Method]

Next, an example of the procedures for the distributed information processing that is mainly performed by the main computer 1m in the afore-described information processing system is described.

<Preparation Stage>

Figure 6:
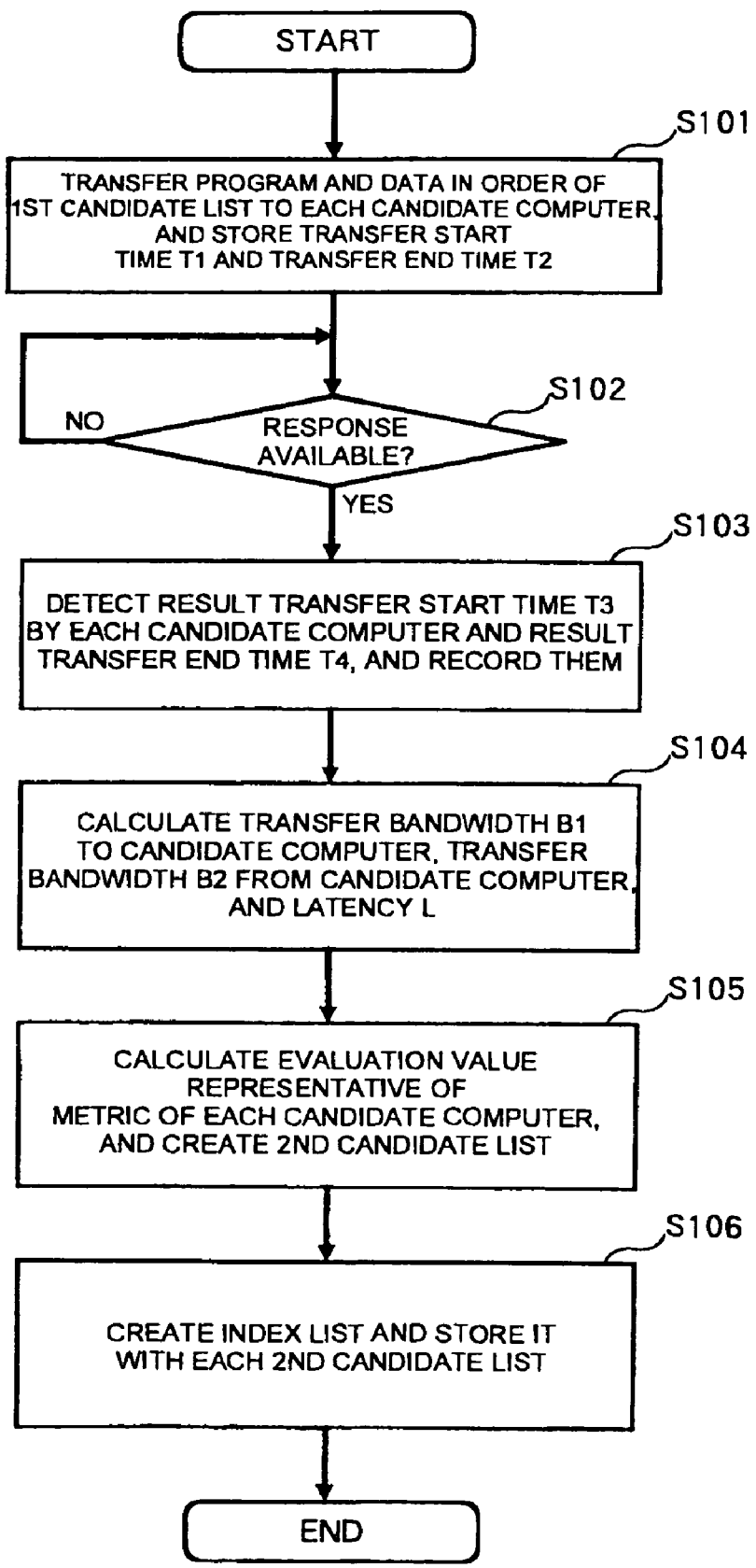
FIG. 6 is a procedure explanatory diagram of preparation steps for distributed information processing.

Prior to the distributed information processing, the main computer 1m ascertains the processing metric of the other available computer 1c as seem from its own, in accordance with the steps of FIG. 6, for example.

First, at the metric information management portion 21, the second metric information regarding the available computers 1c listed in the first available list 212 is measured or acquired.

For example, the program and data for metric evaluation that is stored in the memory 11 are transferred in the order listed in the first available list 212, and the transfer start time T1 and transfer end time T2 are stored in the time storage area of the memory 11 (Step S101).

When a response from each available computer 1c is available (Yes at Step S102), the transfer start time T3 for the result of the processing by each available computer 1c and the result transfer end time T4 are detected, and stored into the afore-described time area (Step S103). Then, the transfer bandwidth B1 to each available computer 1c, transfer bandwidth B2 from each available computer 1c, and latency L are calculated for each available computer (Step S104).

Assuming that the total size of the program and data to be transferred is D1, then the transfer bandwidth B1 may be determined by the formula, D1/(T2−T1). Assuming that the data size of the processing result is D2, then the bandwidth B2 may be determined by the formula, D2/(T4−T3). The latency L may be determined by T3−T1. Assuming that the processing capacity specified by the configuration information of each available computer 1c is P (=processor capacity*number of processors), then the evaluation value is determined for each available computer according to the following evaluation formula, for example.

$$K1*B1+K2*B2+K3*L+K4*P$$

K1, K2, K3, and K4 in the above formula denote coefficients with different weights according to the respective task execution conditions. For example, when the data sent from the main computer 1m to each available computer 1c is large and the data of the processing result is small, K=1.0, K2=0.1, K3=1.0, ad K4=1.0. If the data size is small for both sending and receiving and if the faster the receiving time, the better, then K1=0.1, K2=0.1, K3=1.0, and K4=1.0. If the data size is large but there is little load on the transfer destination, then K1=1.0, K2=1.0, K3=0.1, and K4=0.1. Such conditions are exemplary, and other conditions may also be applicable, of course. The afore-described evaluation formula is linear, but nonlinear equations, such as quadratic expression, may also be used instead.

Based on such evaluation values, the metric information management portion 21 creates the index list 215 from the second available list 214, and store it in the other devices' metric information storage portion 22 (Steps S105 and S106). The preparation stage ends in this way.

<Application Execution>

Figure 7:
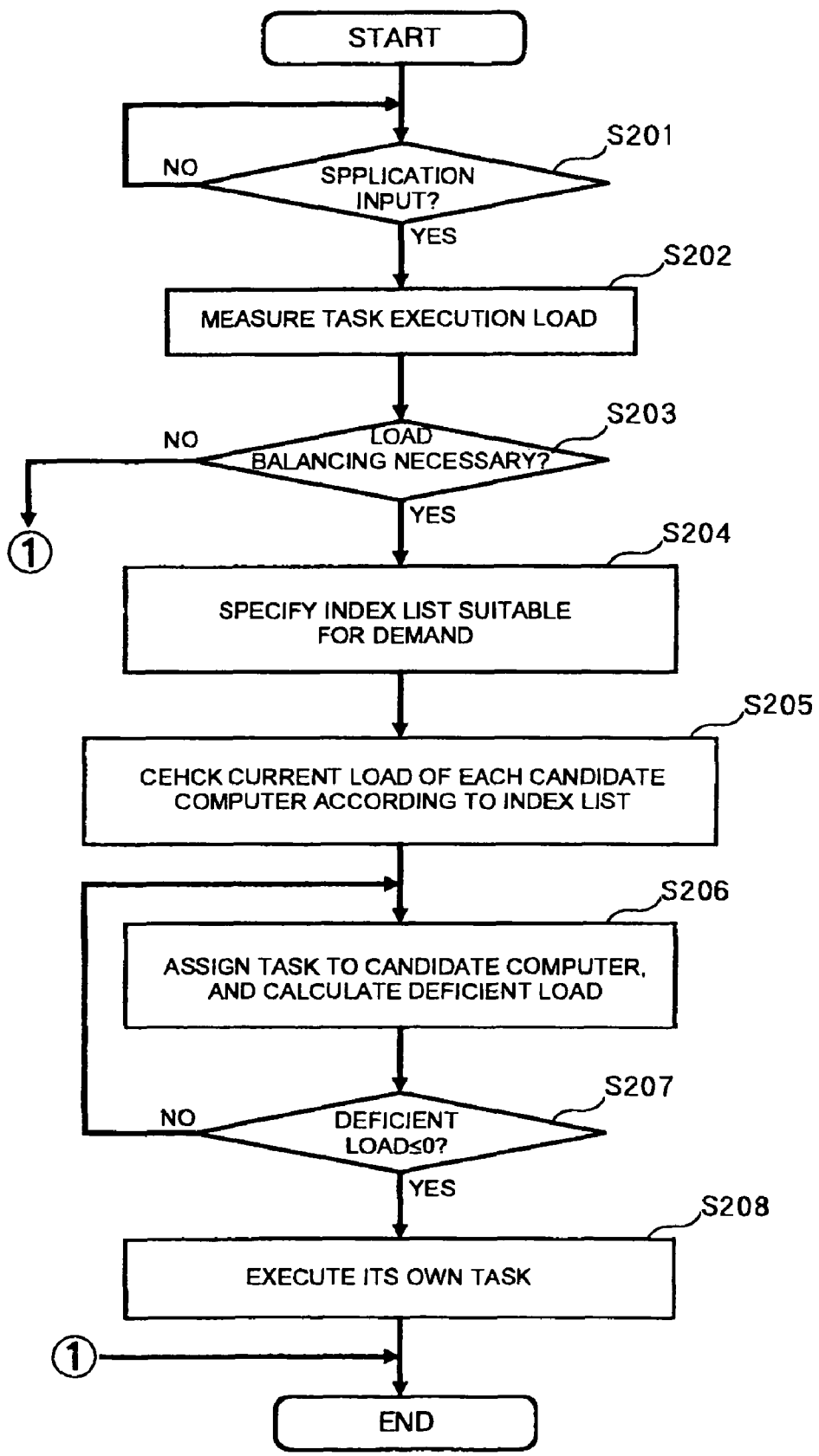
FIG. 7 is an execution procedure explanatory diagram of distributed information processing for application input.

Next, an example of the procedures for information processing when a request for execution of an application where the magnitude of the load is unpredictable is inputted to the main computer 1m where the preparation stage has been completed is described with reference to FIG. 7.

When an application execution request is received at the task input portion 23 (Yes at Step S201), the load measurement portion 24 measures the load of execution for the task performed by the application (Step S202). It then determines whether load balancing is needed or not. If load balancing is needed, the function of the available determination portion 27 is activated (Yes at Step S203).

The available determination portion 27 checks the current operating status (idle state) of its own sub processors 14 monitored by the operating status monitoring portion 26 to determine whether there is room to spare; if not, it calculates deficient load, and specifies an index list 215 suitable for the demand, of the index lists 215 within the other devices' metric information storage portion 22 (Step S204). It then checks the current execution load of each available computer 1c in the order listed in the index list 215 specified (Step S206).

It sequentially assigns tasks to the available computers 1c with load to spare, and recalculates the deficient load (Step S206).

The process of Step S206 is repeated until there is no deficient load, up which time (Yes at Step S207) its own task is executed (Step S208).

If it is determined that load balancing is not needed at Step S203, its own task is executed immediately (No at Step S203).

It should be appreciated that if there are variations in the execution load of the task at the application, or if a certain amount of time has passed since the second metric information of the available computer 1c is listed or sorted in the second available list 214 and index list 215, each available computer 1c may be inquired regarding its current load in accordance with the index list 215, and the second available list 214 and index list 215 may be updated based on the result of the inquiry, or the task may be assigned based on the result of the inquiry.

If load balancing is needed, that is, if its own sub processors 14 are not enough, the tasks that can be processed may be assigned to its own sub processors 14, for the time being.

If processing with another cluster, that is, available computer 1c is more advantageous than with its own sub processor 14, another embodiment is also applicable where its own sub processor 14 is also listed as one of the clusters in the first available list 212, second available list 214, and index list 215, so that a most suitable cluster is specified from all the available clusters, including its own sub processor 14, and a task is assigned thereto.

Furthermore, in cases where there are a small number of types of task execution conditions, the second metric information may be evaluated, without creating the index list 215, at the time when the need for load balancing occurs, to select a most suitable available computer 1c.

In this way, with the information processing system of the present embodiment, by clustering a single program execution means by a plurality of computers, each available computer 1c can easily lease its own computing resources when the computing resources of the program execution means of the main computer 1m connected via the network N become deficient.

With the main computer 1m that accepts leasing of computing resources, the first available list 212 based on static processing metric (first metric information) is created beforehand; the second available list 214 that lists evaluation values based on dynamic processing metric (second metric information) is created, and the index list 215 that classifies the evaluation values listed in the second available list 214 according to the task execution condition is further created; upon task execution, a available computer 1c for load balancing is selected according to the index list 215; thus, once it is found that the load prior to task execution or during task execution is too heavy, a process to search for another available computer with excess computing resources is facilitated, or the need for that process itself is eliminated. This also streamlines the distributed information processing.

It should be appreciated that a plurality of computers that serve as cluster elements of the information processing system have all equivalently configured program execution means, and the program execution means are also clustered by a plurality of sub processors 14, the metric information, especially second metric information, may be represented by the total sum of clusters that are idle at that time, regardless of the type or number of computers.

For example, the operation can be achieved such that when a certain task is executed by a computer, a calculation is made to determine how many clusters the deficient processing capacity corresponds to, secure clusters corresponding to that deficient processing capacity from other computers connected via the network, and assign the task to the secured clusters. In other words, a task that can be executed by a single cluster is ascertained as "a process worthy of a single cluster to complete within the unit time."

Furthermore, the operation is also possible such that clusters that are deficient may be secured, not merely from a single computer, but by daisy-chaining a plurality of computers.

Furthermore, assuming, for example, that a specific auxiliary processor exists, the operation is possible according to the present invention, where a "process worthy of one cluster capable of processing X" based on the first metric information, such as "cluster capable of processing A" or "cluster capable of processing B" is ascertained. This operation can be said to be based on the static metric, as compared to the afore-described "process worthy of a single cluster to complete within the unit time" which is based on the dynamic metric.

No matter whether the computer or its program execution means are equivalent or not, another form of daisy-chaining operation may also be implemented according to the present invention, where a certain computer A assigns a process that cannot be processed by its own performance to another computer B, which then assigns a part or whole of the process to still another computer C.

In the present embodiment, an example has been described where the second available list 214 lists the second metric information of the available computers 1c by separating and aggregating them under unsorted condition, and the index list 215 lists the second metric information of the second available list 214 by sorting them by the task execution condition; however, the second available list 214 may list the second metric information of the available computers 1c sorted by the task execution condition, and the index list 215 may be used as a list for specifying which second available list 214 is suitable for the task execution condition (i.e., listing the list numbers of the second available lists 214).

In other words, the dynamic metric measurement portion 213 classifies the second metric information according to the task execution condition to create the second available lists 214. The task execution conditions vary depending upon the type of the task; thus, the second available lists 214 corresponding to such various task execution conditions are created. Then, by weighting the measured second metric information with coefficient values that are preset according to each of multiple task execution conditions, there is an advantage that second available lists that differ depending upon task execution conditions can be created easily. The available computers 1c from which the second metric information is gathered in order to create such second available lists 214 are selected from the first available list 212 based on the task execution condition. For example, if the task execution condition is related to rendering processing, the available computer 1c with address (AD) of 333 shown in FIG. 5(a) is not suitable for rendering processing; thus, the second metric information is not gathered from this available computer 1c.

Embodiment

Next, an embodiment of the distributed information processing is described below where an application with an unpredictable magnitude of load is image processing.

Image processing includes the afore-described geometry processing and rendering processing. Geometry processing defines a shape of a model (object) in an absolute coordinate space by parameters of an equation that represents vertex coordinates, and boundary lines and/or planes, and converts the defined model to a viewpoint-referenced screen space; it performs, among others, 3-D space coordinate transformation, lighting, and clipping. Rendering processing renders lines or planes on the image memory based on the data generated by the geometry processing, to produce image expression of the model of interest.

Because geometry processing is enormously compute-intensive, it is suitable as an application that is load balanced by a plurality of computers.

Figure 8:
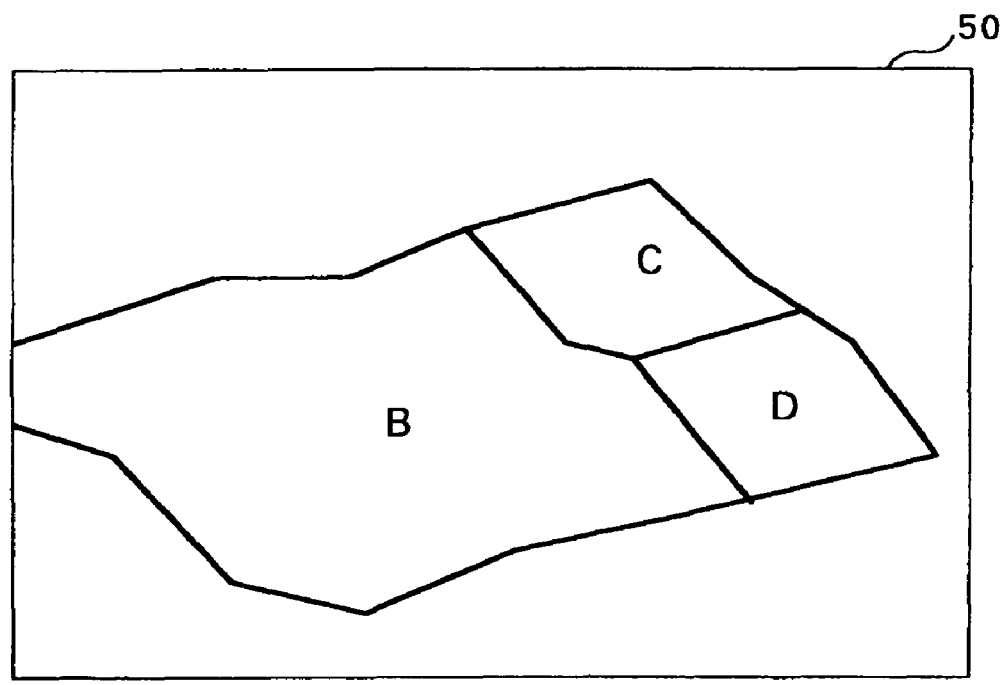
FIG. 8 is an explanatory diagram of a model attained by image processing.

It is presumed here that image processing is intended to create data for displaying a model as shown in FIG. 8 onto a display screen 50. The model is created based on mesh data; for geometry processing, coordinate transformation is performed to vertex data on grid points as shown in FIG. 9.

Figure 9:
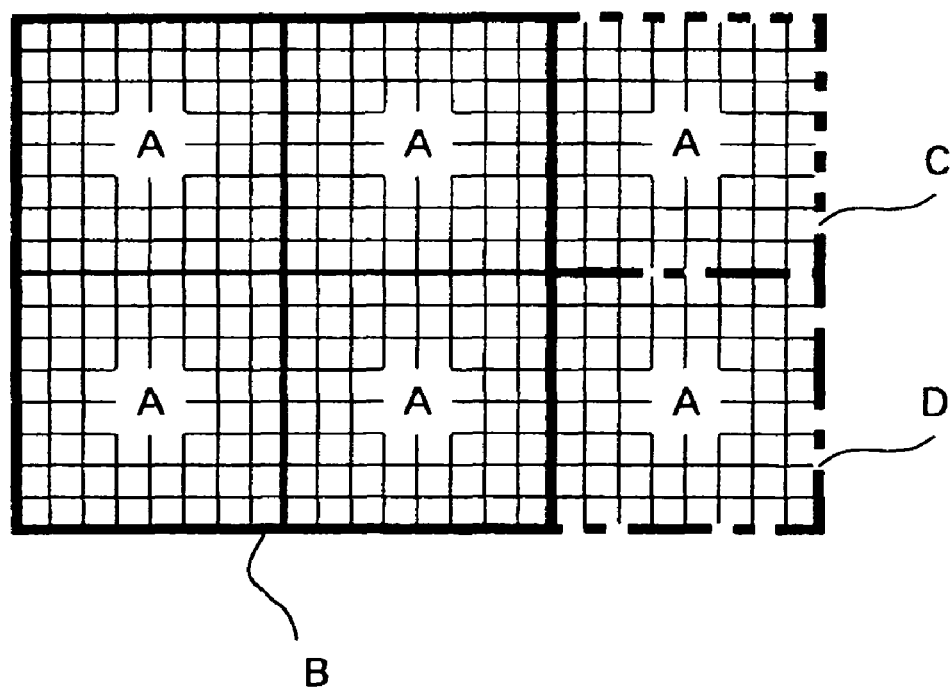
FIG. 9 is an explanatory diagram of data type and size when geometry processing is performed.

Assuming that the main computer 1m has four sub processors 14, as shown in FIG. 2, each of which acts as a cluster element, respectively; each of the sub processors 14 is capable of performing coordinate transformation of 17×17 vertices including four blocks A of 8×8 data per unit time, then the data to be processed is worthy of six blocks, as shown in FIG. 9; thus, when the data is processed by the main computer 1m in one unit time, two blocks worth of processing capacity is deficient. Accordingly, it is necessary to consign geometry processing related to blocks C and D to other available computers 1c.

Then, the main computer 1m finds available computers 1c to balance the load in accordance with the following procedures.

First, with the available computer 1c capable of geometry processing in the first available list 212, the program and data are transferred to each of the available computers 1c over the network to measure the time until the data is received; the transfer bandwidths B1 and B2 and latency L based on the measurement result are determined at the current point in time to create the second available list 214; an evaluation value is then determined for each available computer, and the resulting evaluation value is used to sort the second available list 214 and create the index list 215 suitable for geometry processing. Criteria suitable for geometry processing are such that the sizes of the data to be transferred and received are both large and the response time is fast.

The processing metric PA for geometry processing and the overall processing metric P1 of the main computer 1m are compared to determine deficient processing metric (PA−P1); then, the available computer 1c having the highest rank in the second available list 214 is inquired regarding how much performance is left. The remaining performance P2 is greater than the deficient performance (P2≧PA−P1), the task is assigned to that available computer. If the excess performance of that available computer is less than the deficient performance (PA−P1−P2>0), the processing worthy of excess performance P2 is assigned to the available computer 1c; and other available computers are repeatedly inquired according to the second available list 214, until deficient processing performance is secured.

In this way, once the data for block C and block D are determined by the first and second available computers, respectively, the main computer 1m stores the data into the memory 11, while performing coordinate transformation for the portion of block B, and transferring the data for block C to the first available computer and the data for block D to the second available computer. The first available computer performs coordinate transformation for block C, and transfers the computation result to the main computer 1m, which stores it in the execution result storage portion 29. The second available computer performs coordinate transformation for block D, and transfers the computation result to the main computer 1m, which stores it in the execution result storage portion 29.

Figure 10:
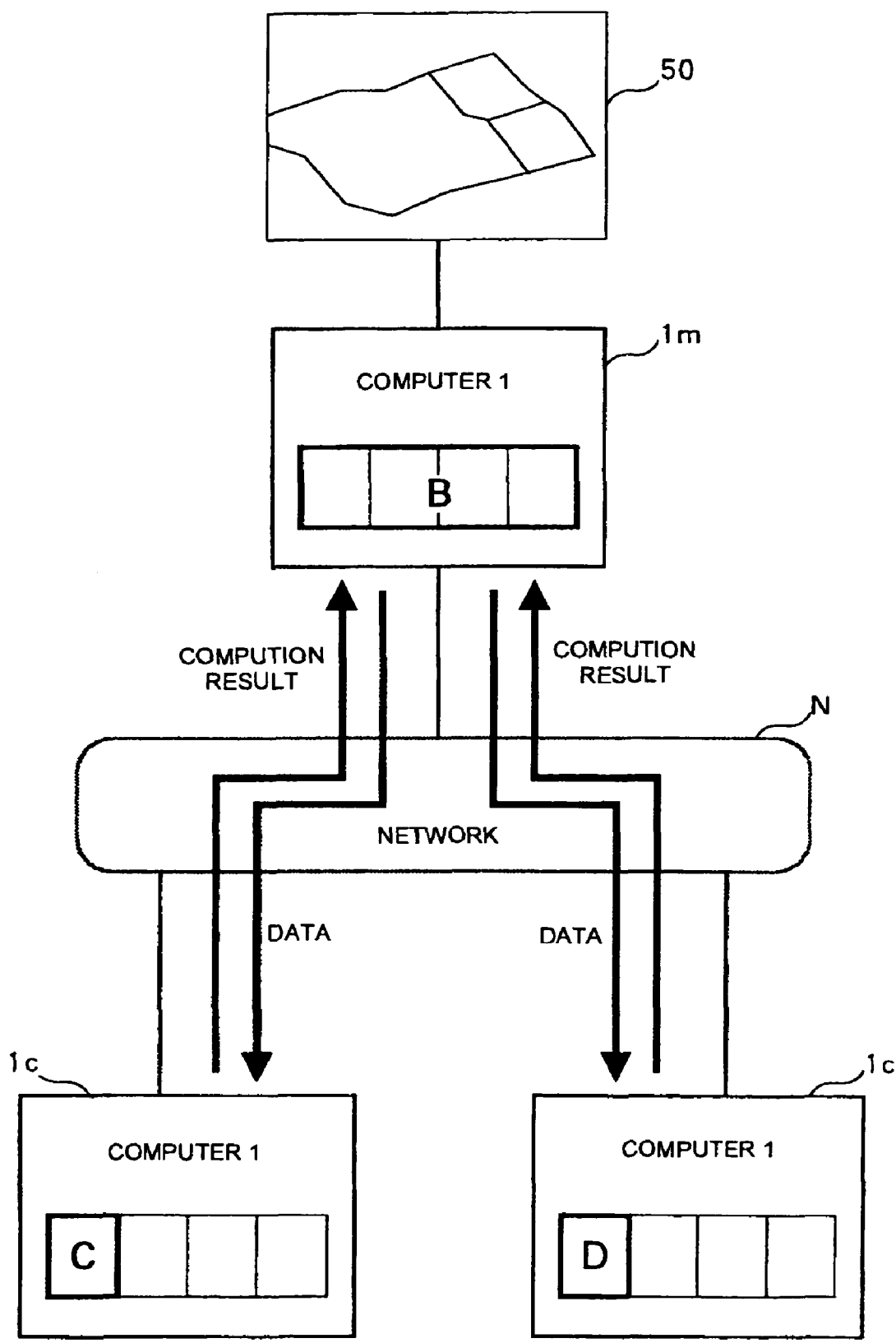
FIG. 10 is an execution procedure explanatory diagram of distributed information processing.

The main computer 1m combines the coordinate transformation result for block B and the coordinate transformation result for blocks C and D to draw an image, and causes the display screen 50 of the display unit connected to its own to display the drawing result. FIG. 10 depicts a flow of the afore-described procedures.

<Variation>

As a variation for the afore-described embodiment, the following flexible operation can be achieved.

For example, in the above embodiment, when it comes to geometry processing, it is necessary to lease computing capacity of other available computers depending upon the processing (computing) load, such as, for example, the amount of data; thus, prior to geometry processing, a first available computer to distribute the processing is found, to which the program for geometry processing is transferred, thereby making a reservation for processing. Then, once it is found that the load is large, only the data is sent to the first available computer to receive the computation result. If the computation is enough on its own, the data will not be sent. Additionally, the data transfer speed and processing speed are multiplied by the number of processors to predetermine the amount of data that can be processed by the first available computer within the unit time, so that the data exceeding that amount will not be transferred. As a result, the processing less than the reserved computing capacity is distributed, but in that case, the first computer may be notified to that effect.

The present embodiment has been described on the presumption that the configurations of the program execution means of all the computers are the same; however, because the present invention may allow idle computing resources to be leased to other computers, it should, of course, be understood that the present invention may be implemented even if the configurations of the program execution means are different from computer to computer.

Considering that computers will be added and connected as appropriate, it should be understood that only a single management computer may manage the metric information for distributed information processing, and other computers may make a request for execution of distributed information processing to other computers via the management computer upon finding that its own load is heavy, in addition to the embodiment where the functions as shown in FIG. 3 are provided to all the computers.

Figure 11:
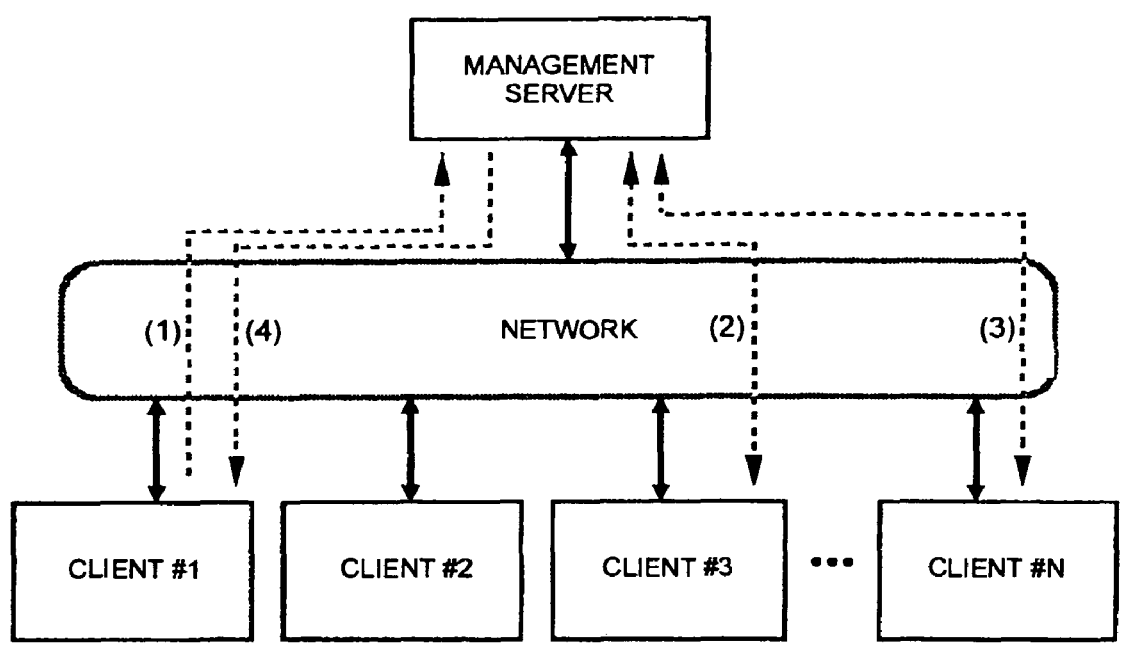
FIG. 11 is an explanatory diagram of another embodiment of the present invention.
Figure 12:
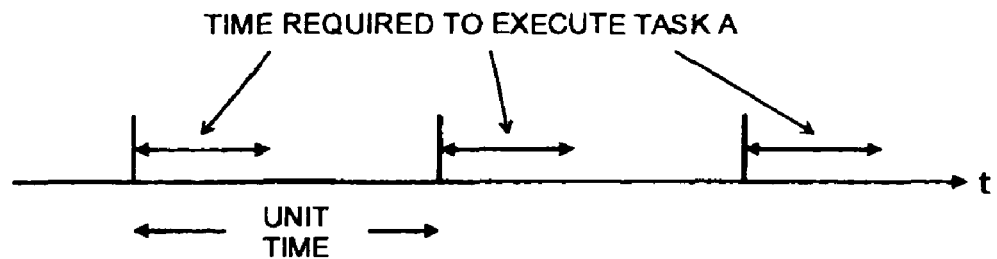
FIG. 12 is a diagram illustrating a timing relationship of a prior art approach for distributed information processing, where (a) is a diagram illustrating the end timing for each task when a plurality of tasks are shared by a single computing resource; (b) is a diagram illustrating a timing relationship of each task and spare time when a plurality of tasks are executed by timing sharing; (c) is a diagram illustrating an adverse condition where each task does not end within a certain time; and (d) is a diagram illustrating an adverse condition where processing is partitioned by small time intervals.
Figure 12:
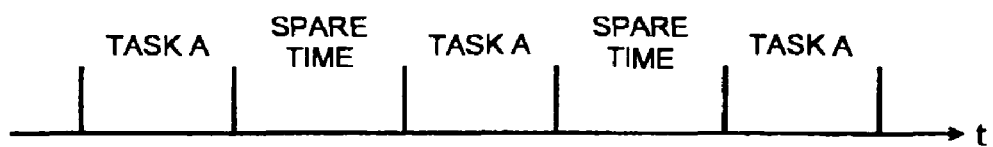
Figure 12:
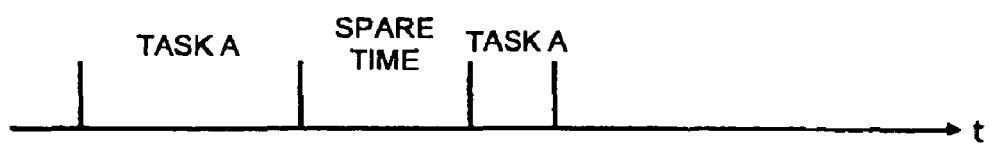
Figure 12:
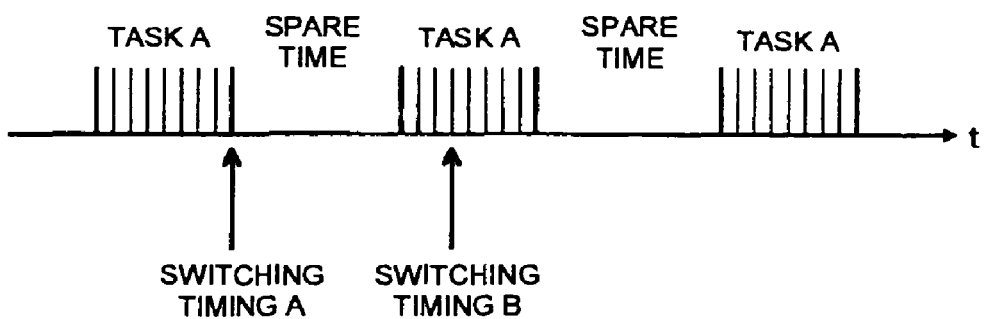

As shown in FIG. 11, for example, one management server and a plurality of clients #1 through #n are connected via a network, and the operating status of the program execution means of each client is monitored by the management server, so that when a request for distributed information processing is made from a certain client, a client with excess computing resources may be caused to execute that distributed information processing, the result of which may be returned to the requesting client.

What is claimed is:

1. An information processing system comprising:
   a plurality of information processing devices each comprising program execution means;
   at least a first information processing device of the plurality of the information processing devices further comprising:
   metric information management means for storing metric information in an updatable manner, said metric information representing processing capability metric of a part or whole of other information processing devices of the plurality of information processing devices excluding the first information processing device itself;
   load measurement means for measuring an actual magnitude of a load of an information processing request received at said at least first information processing device;
   determination means for determining at least one available device by comparing the actual magnitude of the load measured by the load measurement means and the metric information stored in said metric information management means, said at least one available device being capable of executing a part or whole of said information processing request; and
   task assignment means for assigning a task corresponding to a part or whole of the information processing request to the at least one available device determined by said determination means;
   wherein said metric information management means includes:
   first list management means for acquiring first metric information representative of static processing capability metric of said other information processing devices to determine one or more available devices, and storing a first list in a predetermined memory area, said first list being such that the one or more available devices determined are listed; and
   second management means for measuring second metric information representative of dynamic processing capability metric of the one or more available devices listed in said first list, creating a second list such that the second metric information measured is classified and listed per processing capability metric, sorting the available devices having the second metric information listed in the second list according to the task execution condition to determine at least one available device suitable for each task execution condition, and storing an index list, in which the determined at least one available device is listed, in a predetermined memory area;
   wherein the second metric information of the available devices listed in the index list is read from said memory area and supplied as said metric information to said determination means.

2. The information processing system according to claim 1, wherein:
   said first list management means uses, as said first metric information, configuration information of the program execution means provided by each of said other information processing devices and information representative of a type of program that is executable by said program execution means, and compares said first metric information regarding the other information processing devices, thereby determining a listing order in said first list.

3. The information processing system according to claim 1, wherein:
   said second list management means sends a processing request to each of the one or more available devices listed in said first list, and receives a response result corresponding to the processing request, thereby acquiring said second metric information of each of the one or more available devices.

4. The information processing system according to claim 3, wherein:
   said second list management means weights said second metric information with one or more coefficient values each corresponding to a type of processing metric, thereby creating said second list per processing metric.

5. The information processing system according to claim 3, wherein:
   said plurality of information processing devices are interconnected via a network, and said second list management means sends said processing request via said network, and receives the response result corresponding to the processing request via said network.

6. The information processing system according to claim 1, wherein:
   said second list management means updates said created second list and said index list more frequently than said first list.

7. The information processing system according to claim 1, wherein at least one of said plurality of information processing devices is configured so that:
   said program execution means is partitioned into a plurality of clusters; and
   an operating status of each cluster is provided to other information processing devices.

8. The information processing system according to claim 7, wherein:
   at least one of said plurality of information processing devices notifies said other information processing devices of the number of available clusters to be used by the other information processing device as said operating status.

9. The information processing system according to claim 1, wherein the at least one available device comprises:
   second metric information management means for storing metric information in an updatable manner, said metric information representing processing metric of a part or whole of the other information processing devices of the plurality of information processing devices excluding the at least one available device itself;
   second load measurement means for measuring the magnitude of the load of the information processing requested corresponding to the task;
   second determination means for determining at least one other available device by comparing the magnitude of the load measured by the second load measurement means and the metric information stored in said second metric information management means, said at least one other available device being capable of executing a part or whole of said information processing requested corresponding to the task; and
   second task assignment means for assigning the part or whole of the information processing requested corresponding to the task to the at least one other available device determined by said determination means.

10. An information processing system comprising:
a plurality of information processing devices each comprising program execution means;
at least a first information processing device of the plurality of the information processing devices further comprising:
metric information management means for storing metric information in an updatable manner, said metric information representing processing capability metric of a part or whole of other information processing devices of the plurality of information processing devices excluding the first information processing device itself;
load measurement means for measuring an actual magnitude of a load of an information processing request received at said at least first information processing device;
determination means for determining at least one available device by comparing the actual magnitude of the load measured by the load measurement means and the metric information stored in said metric information management means, said at least one available device being capable of executing a part or whole of said information processing request; and
task assignment means for assigning a task corresponding to a part or whole of the information processing request to the at least one available device determined by said determination means;
wherein said metric information management means includes:
first list management means for acquiring first metric information representative of static processing capability metric of said other information processing devices, determining one or more available devices, and storing a first list, in which the determined one or more available devices are listed, in a predetermined memory area; and
second list management means for measuring second metric information representative of dynamic processing capability metric of the one or more available devices listed in said first list, and weighting the second metric information measured with a coefficient value corresponding to each of a plurality of task execution conditions, thereby storing a second list in a predetermined memory area, said second list being such that available devices having second metric information that differ depending upon task execution conditions are listed;
wherein the second metric information of the devices listed in the second list is read from said memory area and supplied as said metric information to said determination means.

11. An information processing device for executing information processing comprising:
program execution means partitioned into a plurality of clusters;
metric information management means for storing metric information in an updateable manner, said metric information representing processing capability metric of each of the plurality of clusters of said program execution means;
load measurement means for measuring a magnitude of a load of an information processing request received at said at least first information processing device, wherein the magnitude of the load is unpredictable;
determination means for determining one or more available clusters by comparing the magnitude of the load measured by said load measurement means and the metric information stored in said metric information management means, said one or more available clusters capable of executing a part or whole of said information processing requested;
task assignment means for assigning a part or whole of said information processing requested to each of said one or more clusters determined by said determination means; and
output means for combining execution results from the respective clusters assigned by said task assignment means and outputting the combined results;
wherein said metric information management means includes:
first list management means for acquiring first metric information representative of static processing capability metric of each of the plurality of clusters of said program execution means to determine one or more available clusters, and storing a first list in a predetermined memory area, said first list being such that the one or more available clusters determined are listed; and
second management means for measuring second metric information representative of dynamic processing capability metric of the one or more available clusters listed in said first list, creating a second list such that the second metric information measured is classified and listed per processing capability metric, sorting the available clusters having the second metric information listed in the second list according to the task execution condition to determine at least one available cluster suitable for each task execution condition, and storing an index list, in which the determined at least one available cluster is listed, in a predetermined memory area;
wherein the second metric information of the available clusters listed in the index list is read from said memory area and supplied as said metric information to said determination means.

12. The information processing device according to claim 11, further comprising:
processing request execution means for executing required information processing corresponding to a processing request issued by another information processing device, and returning the execution result thereof, together with a transmission start time, to said another information processing device; and
notification means for providing the metric information stored in said metric information management means to other information processing devices.

13. The information processing device according to claim 11, wherein:
each of said plurality of clusters further comprises a processor.

14. A distributed information processing method, wherein:
each of a plurality of information processing devices interconnected via a network measures processing capability metric of other information processing devices through the network, and mutually stores metric information representative of the measured processing capability metric in a predetermined memory area in an updateable manner, wherein a part of resources of a program execution means of one or more of the plurality of information processing devices is available for use in another information processing device in response to a processing request, and
at each of the information processing devices, when a request occurs for information processing at said information processing device, such that the magnitude of the load of said information processing is unpredictable, the information processing device where a request for such information processing has occurred executes the processes of:

measuring a magnitude of the load of said information processing; comparing the magnitude of the load measured and the metric information stored in said memory area to determine one or more available devices capable of executing a part or whole of said requested information processing; assigning at least a part of said requested information processing to the one or more available devices determined; combining the execution results of the assigned devices; and outputting the combined execution results;

wherein said measuring processing capability metric of other information processing devices through the network comprises:

acquiring first metric information representative of static processing capability metric of said other information processing devices to determine one or more available devices, and storing a first list in the predetermined memory area, said first list being such that the one or more available devices determined are listed; and measuring second metric information representative of dynamic processing capability metric of the one or more available devices listed in said first list, creating a second list such that the second metric information measured is classified and listed per processing capability metric, sorting the available devices having the second metric information listed in the second list according to the task execution condition to determine at least one available device suitable for each task execution condition, and storing an index list, in which the determined at least one available device is listed, in a predetermined memory area;

wherein the second metric information of the available devices listed in the index list is read from said memory area and supplied as said metric information to said determination means.

15. A computer-readable storage medium storing a computer program which causes an information processing device to execute processes of:

measuring processing capability metric of a plurality of other information processing devices connected to the information processing device via a network through said network;

storing metric information representative of the measured processing capability metric of the other information processing devices in a predetermined memory area in an updateable manner;

when a certain request for information processing occurs at said at least first information processing device such that the magnitude of load of the requested information processing is unpredictable, measuring the magnitude of the load of such information processing;

comparing the magnitude of the load measured and the metric information stored in said memory area to determine one or more available devices such that at least a part of said requested information processing can be distributed to the one or more available devices and executed in the available device;

assigning at least a part of said requested information processing to the one or more available devices determined; and combining the execution results of the one or more assigned available devices and outputting the combined results;

wherein said measuring processing capability metric of other information processing devices and storing metric information representative of the measured processing capability metric of other information processing devices comprises:

acquiring first metric information representative of static processing capability metric of said other information processing devices to determine one or more available devices, and storing a first list in the predetermined memory area, said first list being such that the one or more available devices determined are listed; and measuring second metric information representative of dynamic processing capability metric of the one or more available devices listed in said first list, creating a second list such that the second metric information measured is classified and listed per processing capability metric, sorting the available devices having the second metric information listed in the second list according to the task execution condition to determine at least one available device suitable for each task execution condition, and storing an index list, in which the determined at least one available device is listed, in a predetermined memory area;

wherein the second metric information of the available devices listed in the index list is read from said memory area and supplied as said metric information to said determination means.

16. A distributed information processing method, wherein:

each of a plurality of information processing devices interconnected via a network measures processing capability metric of other information processing devices through the network, and mutually stores metric information representative of the measured processing capability metric in a predetermined memory area in an updateable manner, wherein a part of resources of a program execution means of one or more of the plurality of information processing devices is available for use in another information processing device in response to a processing request, and at each of the information processing devices, when a request occurs for information processing such that the magnitude of the load of said information processing is unpredictable, the information processing device where a request for such information processing has occurred executes the processes of:

measuring a magnitude of the load of said information processing; comparing the magnitude of the load measured and the metric information stored in said memory area to determine one or more available devices capable of executing a part or whole of said requested information processing; assigning at least a part of said requested information processing to the one or more available devices determined; combining the execution results of the assigned devices; and outputting the combined execution results;

wherein said measuring processing capability metric of other information processing devices through the network comprises:

acquiring first metric information representative of static processing capability metric of said other information processing devices, determining one or more available devices, and storing a first list, in which the determined one or more available devices are listed, in a predetermined memory area; and measuring second metric information representative of dynamic processing capability metric of the one or more available devices listed in said first list, and weighting the second metric information measured with a coefficient value corresponding to each of a plurality of task execution conditions, thereby storing a second list in a predetermined memory area, said second list being such that available devices having second metric information that differ depending upon task execution conditions are listed;

wherein the second metric information of the devices listed in the second list is read from said memory area and supplied as said metric information to said determination means.

17. A computer-readable storage medium storing a computer program which causes an information processing device to execute processes of:

measuring processing capability metric of a plurality of other information processing devices connected to the information processing device via a network through said network;

storing metric information representative of the measured processing capability metric of the other information processing devices in a predetermined memory area in an updateable manner;

when a certain request for information processing such that the magnitude of load of the requested information processing is unpredictable occurs, measuring the magnitude of the load of such information processing;

comparing the magnitude of the load measured and the metric information stored in said memory area to determine one or more available devices such that at least a part of said requested information processing can be distributed to the one or more available devices and executed in the available device;

assigning at least a part of said requested information processing to the one or more available devices determined; and combining the execution results of the one or more assigned available devices and outputting the combined results;

wherein said measuring processing capability metric of other information processing devices and storing metric information representative of the measured processing capability metric of other information processing devices comprises:

acquiring first metric information representative of static processing capability metric of said other information processing devices, determining one or more available devices, and storing a first list, in which the determined one or more available devices are listed, in a predetermined memory area; and measuring second metric information representative of dynamic processing capability metric of the one or more available devices listed in said first list, and weighting the second metric information measured with a coefficient value corresponding to each of a plurality of task execution conditions, thereby storing a second list in a predetermined memory area, said second list being such that available devices having second metric information that differ depending upon task execution conditions are listed;

wherein the second metric information of the devices listed in the second list is read from said memory area and supplied as said metric information to said determination means.

18. An information processing device for executing information processing comprising:

program execution means partitioned into a plurality of clusters;

metric information management means for storing metric information in an updateable manner, said metric information representing processing capability metric of each of the plurality of clusters of said program execution means;

load measurement means for measuring a magnitude of a load of an information processing request received at said at least first information processing device, wherein the magnitude of the load is unpredictable;

determination means for determining one or more available clusters by comparing the magnitude of the load measured by said load measurement means and the metric information stored in said metric information management means, said one or more available clusters capable of executing a part or whole of said information processing requested;

task assignment means for assigning a part or whole of said information processing requested to each of said one or more clusters determined by said determination means; and output means for combining execution results from the respective clusters assigned by said task assignment means and outputting the combined results;

wherein said metric information management means includes:

first list management means for acquiring first metric information representative of static processing capability metric of each of the plurality of clusters of said program execution means, determining one or more available clusters, and storing a first list, in which the determined one or more available clusters are listed, in a predetermined memory area; and second list management means for measuring second metric information representative of dynamic processing capability metric of the one or more available clusters listed in said first list, and weighting the second metric information measured with a coefficient value corresponding to each of a plurality of task execution conditions, thereby storing a second list in a predetermined memory area, said second list being such that available clusters having second metric information that differ depending upon task execution conditions are listed;

wherein the second metric information of the clusters listed in the second list is read from said memory area and supplied as said metric information to said determination means.

* * * * *